United States Patent [19]

Callender et al.

[11] Patent Number: 5,365,184

[45] Date of Patent: Nov. 15, 1994

[54] QUADRATURE PHASE PROCESSING

[75] Inventors: Alan B. Callender, Stuart; Robert A. Bondurant, Palm City, both of Fla.

[73] Assignee: United Technologies Corporation, Hartford, Conn.

[21] Appl. No.: 3,918

[22] Filed: Jan. 13, 1993

[51] Int. Cl.$^5$ .............................................. G01S 13/50
[52] U.S. Cl. ........................................ 327/2; 324/118; 342/127; 342/135; 327/3; 327/238
[58] Field of Search ................ 328/149, 133, 155; 307/134, 512, 514, 515, 516, 513; 324/118, 134, 534; 342/127, 135

[56] References Cited

U.S. PATENT DOCUMENTS

| | | | |
|---|---|---|---|
| 3,766,555 | 10/1973 | Watt | 342/127 |
| 3,854,133 | 12/1974 | Cabion | 342/127 |
| 4,238,795 | 12/1980 | Schiek et al. | 342/122 |
| 4,475,088 | 10/1984 | Beard | 328/134 |
| 4,477,773 | 10/1984 | Margerum | 328/134 |
| 4,748,348 | 5/1988 | Thong | 307/603 |
| 4,949,364 | 8/1990 | Yukawa | 307/512 |
| 5,113,191 | 5/1992 | Knepper et al. | 342/119 |

*Primary Examiner*—Timothy P. Callahan
*Assistant Examiner*—Dinh T. Le
*Attorney, Agent, or Firm*—Robert E. Greenstien

[57] ABSTRACT

A phase modulated signal is split into quadrature components $Savg+SaSin(\phi(t)+kx(t))$ and $Cavg+CaCos((\phi(t)+kx(t)))$. The average value for each signal is compared with the signal to produce a data bit whose meaning is that the average value was exceeded at a sampling instant. The bits at successive times ($t_0$ and $t_1$) are separated by an interval set by the Nyquist rate on the peak rate of change of the phase for the signal. Four bits at two sample times $t_0$ and $t_1$ are processed to determine the phase quadrants modulo 360 degrees to determine the direction of the phase change. The determination is used to produce a counter enable signal, counter direction control signal (up/down) and optionally an error signal if the phase change during one clock period is more than plus or minus one quadrant. A tracking counter counts the number of quadrants of change from those signals.

19 Claims, 5 Drawing Sheets

| PRESENT (t₀) | | | PREVIOUS (t₀) | | | ENABLE | UP/DOWN | FAULT |
|---|---|---|---|---|---|---|---|---|
| SINE | COSINE | QUADRANT | SINE | COSINE | QUADRANT | | | |
| ++-- | +--+ | 0 1 2 3 | ++-- | +--+ | 0 1 2 3 | oooo | xxxx | oooo |
| ++-- | +--+ | 0 1 2 3 | -++- | ++-- | 3 0 1 2 | ---- | ---- | oooo |
| ++-- | +--+ | 0 1 2 3 | +--+ | --++ | 1 2 3 4 | ---- | oooo | oooo |
| ++-- | ++-+ | 0 1 2 3 | --++ | -+-+ | 2 3 0 1 | oooo | xxxx | ---- |

FIG. 5

QUADRATURE PHASE PROCESSING

TECHNICAL FIELD

This invention relates generally to phase recovery measurement techniques, in particular, transmitting systems that recover time-varying phase characteristics from quadrature based signals.

BACKGROUND OF THE INVENTION

In the state of the art, many applications recover time variations of parameters, such as distance and velocity, through the effect on the phase of test signals, pressure, temperature, distance, electric field strength, magnetic field strength, strain, and acoustic fields being some of those parameters. Many instruments that are designed for those purposes are based on detecting the phase of a return periodic "probe" signal, which may be acoustic, radio frequency or optical but is limited by the amount of data that is processed, to avoid complexity. The time varying parameter is "band limited" by the nature of the parameter variation (e.g. the temperature change is limited by heat capacity and heat source-sink strength), which, following accepted signal processing concepts, imposes a fundamental sampling rate requirement for "unambiguously" recovering the parameter's variation with time. The requirement, which is well understood, is most often referred to as the "Nyquist" rate. The parameter variation, which forms information that may be seen in terms of quadrature signals I(t) and Q(t) that are proportional to the sine and cosine of the "carrier" plus the phase shift $\phi(t)$, is best expressed by the following equations for the case in which the parameter is distance:

$$I(t) = I_0 + I_1 \cdot \text{COS}\ (2\pi f_0 t + k(t) \cdot X(t) + \phi_0) \quad 1)$$

$$Q(t) = I_0 + I_1\ \text{SIN}\ (2\pi f_0 t + k(t) \cdot X(t) + \phi_0) \quad 2)$$

$$\phi(t) = k(t) \cdot X(t) + \phi_0 \quad 3)$$

in which k(t) is the propagation constant (radians/distance), X(t) is the position at time t, $\phi_0$ is a constant value for phase, inferred from the measurements of the phase $\phi(t)$ and $f_0$ is the frequency (Hz) of the carrier. In these equations, k depends on the material parameters, and variations in k with time may be measured indirectly by the variation in phase, assuming that distance does not change. The minimum rate of simultaneous sampling of the quadrature signals I(t) and Q(t) is set by the requirement that the recovered phase $\phi(t)$ must not become ambiguous (i.e. undersampled) very often or unrecoverable information loss will appear. Occasional ambiguities can be treated in post-processing by the heuristic requirement that the recovered signal must not have discrete jumps-but only if the signal to noise ratio is high. The minimum rate is expressible in terms of the expected peak rate of change of phase (frequency) deviation from the carrier frequency and the quadrature pair I(t) and Q(t) must be sampled in less than the time required for the phase to advance or retard by a half-cycle relative to the carrier. This is equivalent to the Nyquist rate requirement on the frequency. Following conventional wisdom, sampling would take place at twice that rate.

The minimum Nyquist sampling rate is proportional to the product of the maximum phase shift and the frequency of variation of the parameter. In the usual case of a band limited parameter variation, a power spectral estimate is used to calculate the effective or design value of that product. A large amplitude is desirable because noise limits the precision with which the parameter can be estimated through the phase shift. This occurs because noise introduces uncertainty in the recovery of the phase shift on the fundamental measurement interval (0–360 degrees). If the phase shift is allowed to extend beyond this interval, the phase shifted signal bandwidth increases while the noise remains fixed. Similarly, high bandwidth is desirable to increase utility to a larger set of parameters (increased dynamic range).

Engineering practice follows two methods: limit the measurement of data per sample (using reduced phase resolution on each sample), allowing large amplitude-frequency products but limited in dynamic range; or reduce the allowable bandwidth or the amplitude of the parameters to provide higher resolution sampling at acceptable sampling rates. The first method is typically used for machine tool motion control; the second is more often used for optical testing of components. Neither method provides especially uniform high dynamic range capability with system sampling at the Nyquist rate set by the parameter band limit. The first method must sample at many times the parameter variation bandwidth set by the Nyquist rate. The second method may approach the Nyquist rate, but only as the dynamic range gets poorer, when the phase amplitude is then generally limited to less than ±180 degrees.

DISCLOSURE OF THE INVENTION

Among the objects of the present invention is providing high dynamic range interferometry, in particular providing a way to have a high amplitude-bandwidth product and sample at the band limited parameter Nyquist rate, to provide high dynamic range and phase recovery at reduced sampling rates.

According to the present invention, a phase modulated signal is split into quadrature components Savg+SaSin($\phi$(t)+kx(t)) and Cavg+CaCos(($\phi$(t)+kx(t)). Here Sa and Ca are imprecisely known amplitudes and Cavg and Savg are imprecisely known average values. The average value for each signal is compared with the signal to produce a data bit whose meaning is that the average value was exceeded at a sampling instant. The bits at successive times ($t_0$ and $t_1$) are separated by an interval set by the Nyquist rate on the peak rate of change of the phase, and thus period of this frequency is no longer than a fraction of the time expected for a phase change of $\pi/2$ in $\phi$(t). That fraction (q) preferably is between 0.5 and 0.8. Four bits-two respectively for I(t) and Q(t) at the two sample times $t_0$ and $t_1$—are processed to determine the phase quadrants modulo 360 degrees at both sample times, and, if a change has taken place, to determine the direction of the change. The determination is used to produce a counter enable signal, counter direction control signal (up/down) and optionally an error signal if the phase change during one clock period is more than plus or minus one quadrant. A tracking counter counts the number of quadrants of change. The quadrature signals are also applied to track and hold amplifiers and analog to digital converters that simultaneously sample the signals at another significantly lower clock frequency. The clock frequency is set by the bandwidth of the parameter that is measured and may be as low as the Nyquist rate for the parameter bandwidth. The sample values are applied to the analog to digital converters, producing digital values indicative of the value of each signal at each sample time and the digital values are processed using conventional interpolation to find the location in the period between 0 and $2\pi$. In this way, two signals are generated, one indicating the number of quadrants of phase shift (which may be extended by counter chaining for plural quadrants) or a coarse value of the phase shift and the other a five resolution signal (still limited by the signal to noise ratio in real dynamic range) on the basic four quadrant interval (0–360 degrees). The two signals are merged, preferably by simultaneously clocking them to a common display or predisplay processor at the lower clock sample rate, which recovers the band limited parameter, allowing both large phase amplitude and low analog to digital conversion rates.

According to one aspect of the invention count of quadrants may be provided independently from the clocking of the two signals defining the quadrant and the interval between 0 and 360 degrees.

According to one aspect of the invention, the fraction of the time expected for a phase change of $\pi/2$ in $\phi(t)$ is selected to have a decimal value of between 0.5 and 0.8.

According to another aspect of the invention state machines are used to establish the quadrants and 0–360 degree signals.

According to another aspect of the invention, the average value for each signal is compared with the signal to produce a data bit which is held in a register for subsequent comparison with a second bit produced at a latter time interval. The second bit is likewise then held in the register for a similar comparison with a subsequent bit.

Among the features of the present invention, it provides a way to accurately measure position change of an object that moves comparatively rapidly over a small distance. Another feature is that the quadrant count, which tracks phase, produces an output that is available at the high clock rate if required for coarse process control. Another feature is that full tracking of the phase shift at a rate determined by the rate of change of phase is not needed.

The following discussion of a preferred embodiment of the present invention will reveal other aspects, objects, benefits and features of the present invention.

BEST MODE FOR CARRYING OUT THE INVENTION

Figure 1:
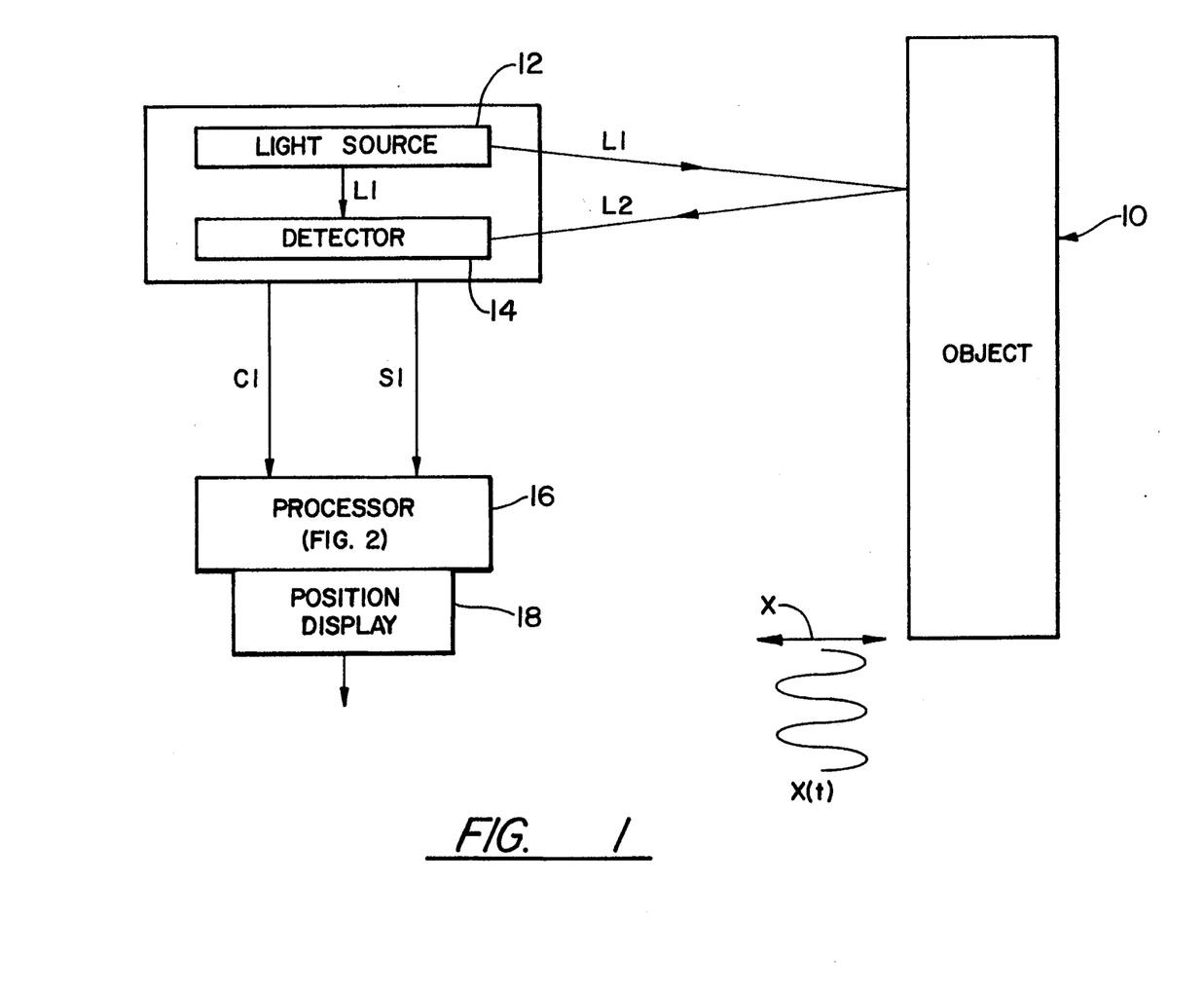
FIG. 1 is a block diagram of an interferometer using quadrature phase processing according to the present invention.
Figure 3:
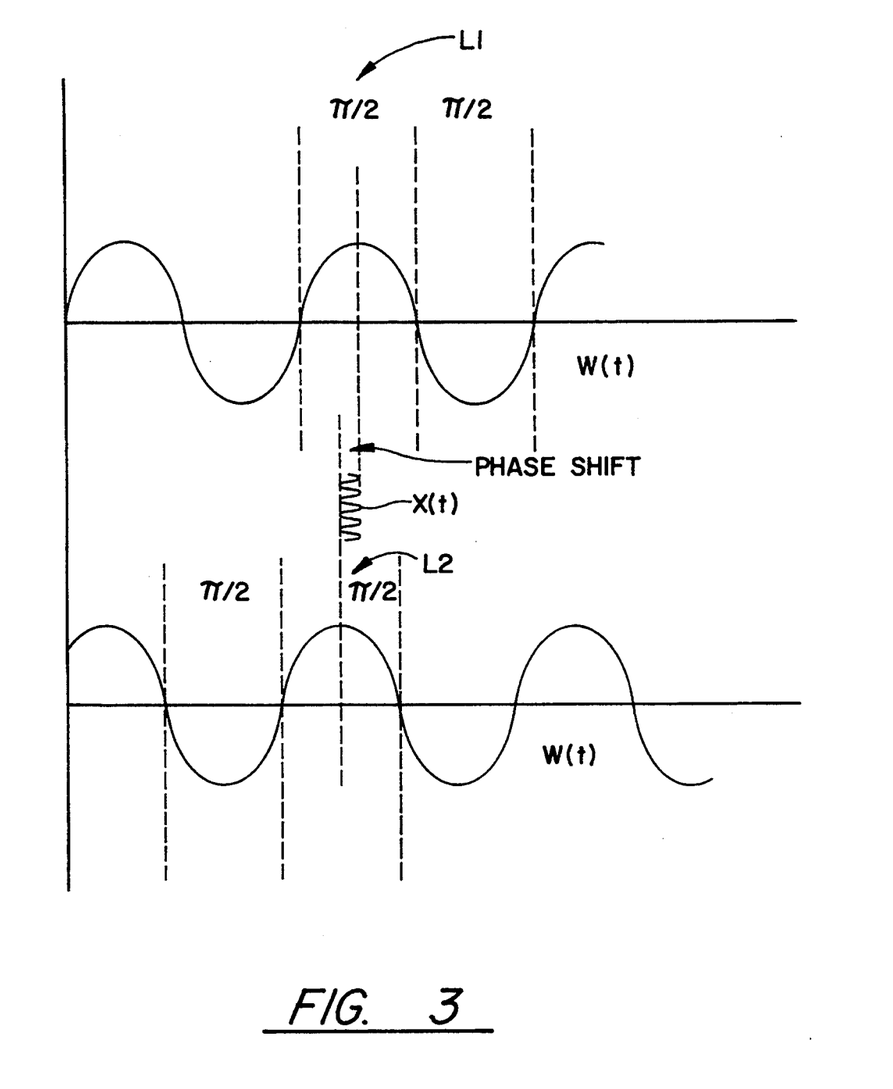
FIG. 3 is a functional block diagram of a signal processing system for carrying out the invention.

One application for the present invention is an interferometer, in which energy is transmitted to an object and compared with the energy reflected from the object to determine characteristics of the object, such as its distance, speed and surface characteristics. An interferometer could use acoustic energy, RF or light. In FIG. 1, an object 10 is assumed to move in the X direction with a characteristic X(t), assumed to be vibratory in nature, as illustrated by the oscillating waveform. This motion is sensed by transmitting light L1 from a light source 12, e.g. CW wave laser, so that time continuous quadrature signals are available. Light L1 is reflected back from the object 10 as light L2, which is applied to a detector 14. The detector also receives a portion of L1 and is assumed to use known techniques for sensing the phase difference between L1 and L2 caused by the distance to the object, which causes a fixed phase shift, and oscillating phase shift at the frequency of X(t). FIG. 3 illustrates the phase shift between signals L1 and L2, which is well known, and the shift is assumed to have a time varying component caused X(t). The detector 14 produces two quadrature signals $S1 = Savg + SaSin(\phi(t) + kx(t))$ and $C1 = Cavg + CaCos((\phi(t) + kx(t))$. S1 and C1 are supplied to a signal processor 16 and it processes the signals using the apparatus and routines described below to deduce the object's position at any time.

Figure 2:
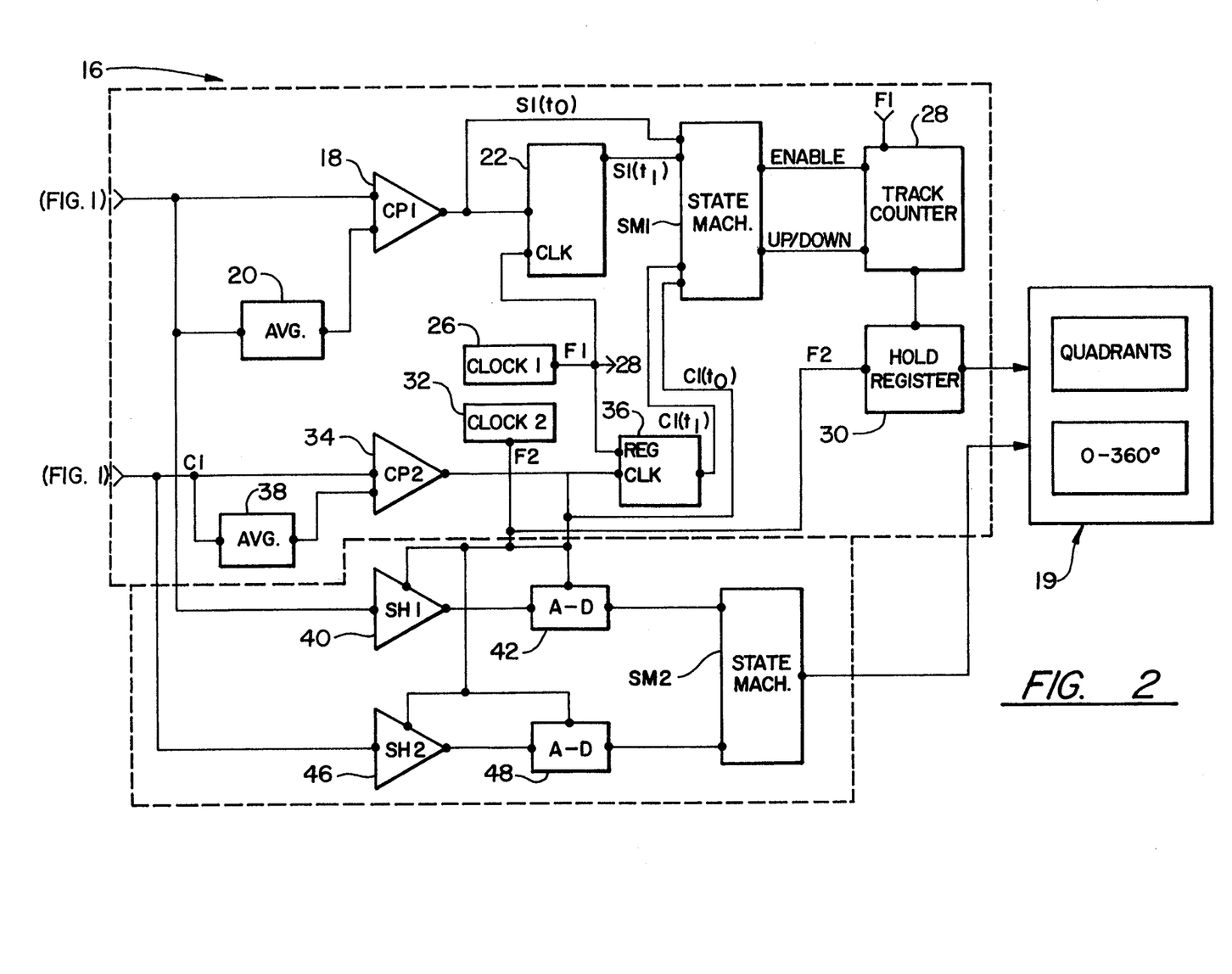
FIG. 2 shows two phase shifted sine waveforms that are on a common time base to demonstrate relative frequency modulated phase shifting used by the present invention.

In FIG. 2, signals S1 and C1 are separately provided to one input on comparators CP1, CP2. An averaging sub-system (AUG) 20, 38 receives the signal S1, C1 and produces on a second input b to each comparator, which input it a signal that manifests the average of the signal S1, C1 at time $t_n$. Each comparator CP1, CP2 produces a digital output when the level of S1, C1 exceeds the average, which may vary with time. The output from the comparators CP1, CP2 are supplied two devices, registers 22, 36. The other is a state machine SM1. A clock 26 produces clock pulses at a frequency $f_0$ that are supplied simultaneously to the registers 22, 36, causing the output of CPI, CP2 at time $t_0$ to be applied to a second input at state machines SM1 at time $t_1$. As a result, at time $t_1$, each state machine has as input of two bits for S1 and two bits for C1, each bit representing that S1 and C1 have exceeded the value of Savg and Cavg at two sampling times $t_0$ and $t_1$ ($t_0$ being the "most current" time). It should be understood that these two intervals correspond to two successive points on L2 in FIG. 3 (two successive periods at frequency $f_0$ of clock F1).

The state machine SM1 employs the four bits, at any time on its inputs a, b, c, d, to produce an enable signal, an up/down signal, and a "fault" signal. The enable and up/down signals are supplied to a track counter 28, which counts up or down by one count in response to the enable signal and the up/down signal. Through this process the track counter maintains a count of the number of quadrants in the signal L1 at any time, those quadrants reflecting elapsed time and thereby distance to the object. A hold register 30 accumulates those quadrants digitally for display on a display unit 19 when clocked from second clock, which will be explained below. The state machine SM1 does not produce the count enable if a change in phase occurs that is, in absolute value, than one, a condition that is indicated by the fault signal, which is generated within the state suit at those times. It is assumed, of course, that the track counter is reset (initialized) to zero at system start-up, as in other similar counter applications The signals S1 and C1 are also applied to sample and hold units (SH1, SH2) 40, 46, which are controlled by a second clock, clock 2, operating at a frequency $f_2$ to produce a signal F2, supplied to each sample and hold. With each clock pulse, the sample and hold captures the value of signals S1 and C1. The output from each sample and hold is applied to an A-D converter 42, 48, which provide to a second state machine SM2 an instantaneous value of S1 and C1, which the state machine SM2 uses to calculate the phase modulo 360 degrees. The output from the state machine SM2 is applied to a second display in unit 18, which displays the number of quadrants or coarse position, and the interval 0–360 degrees. The value in the tracking counter 28 is combined with the state machine SM2 output to produce the recovered high amplitude, high resolution phase samples at the Nyquist rate times for the parameter band limit. This is accomplished by clocking the quadrant value in register 30 to the display unit 18 with the clock signal F2.

The frequency of F1 is selected based on the requirement that the peak rate of change of phase not be undersampled. For example, assume that X(t) can vary at a rate between 0–20 kHz; in other words, the object may be stationary or oscillating at a frequency as high as 20 kHz. Further assume that the phase modulations amplitude is 168 radians. The peak radian rate may be as high as $21.1 \times 10^6$ radians/sec. One quarter (Q1) of a period of this 74.6 ns. According to the invention, Q should be between 0.5 and 0.8, where Q=Period of $f_0$/Q1, in this case 74.6 ns, which translates into a frequency range between 16.8 and 26.8 mHz.

Frequency $f_2$ is selected using the basic Nyquist criteria on the parameter x(t). The sampling rate should be at least twice the bandlimit of x(t), which translates to 40 kHz in the previous example.

State machine SM1 is programmed to have separate states to achieve the signal processing described previously and embraced by the flow chart shown in FIG. 1. In step S1, the value of $S1(t_1)$ and $C1(t_1)$ are read, this being the first time, referred to as time $t_1$. From this, the state machine determines the quadrant (q) using the basic trigonometric relationship expressed for S1 and C1 ($S1=Savg+SaSin(\phi(t)+kx(t))$ and $C1=Cavg+CaCos((\phi(t)+kx(t))$, but it should be observed that the magnitudes and average values have been removed through the sampling process involving the comparators CP1, CP2. Since the period of F1 is set to be less than one quarter of a period of the peak frequency deviation of the phase modulated signal, the quadrant so derived will differ by $+/-1$ or zero from the previous internal value. In step S3, $S1(t_0)$ and $C1(t_0)$ are read, these being the values at a subsequent, more current interval, $t_0$. The quadrant values for these are computed in step S4 and a test is made in step S5 that determines, based on the difference in the quadrant values, if there has been a quadrant change. An affirmative answer, causes an update sequence in step S6, in which the value of S1 and C1 at $t_0$ becomes the value for $t_1$, which is then used in a subsequent computation cycle at step S1. Following the update in step S6 the count of phases is incremented at step S7. Then the computation cycle ends, the assumption here being that it is understood that it would again be run beginning with step S1, but using the update value for S1 and C1 at $t_0$. If the phase values (q) at the two times are not equal at step S5, a negative test answer results and the process goes to step S8, where a test is made that determines if the phase shift has increased by one quadrant (unit). The process assumes that if there has been a skip and an increase of more than one, that the count should not be updated. If the increase has been by one quadrant, the counters are enabled for up counting in step S11 and then the update takes place in step S6, and the count is increased by one unit, as explained before. A negative answer at step S8, leads to a test that determines if the phase shift has decreased by one unit, at step S10. A positive answer, which is acceptable, leads to a step, S13, where a down count is enabled. From step S13, the process again leads to the update step at S6 and the subsequent steps leading to a count change, but in this instance the count reverses by one unit. A negative answer at step S10 means that the quadrant has either increased or decreased more than one unit. (Note, step S8 determined that the increase was not one unit.) This leads to optional step S9, where a test is made to see if the increase in phase from $t_1$ to $t_0$ is more than one unit. A positive answer is used at step S12 to set a fault flag, which may be used to provide a separate indication to an observer of 18 (FIG. 2) that there has been an error—a phase skip in effect. In either, the case of a positive answer or negative answer at step S9, the count is not changed.

Figure 4:
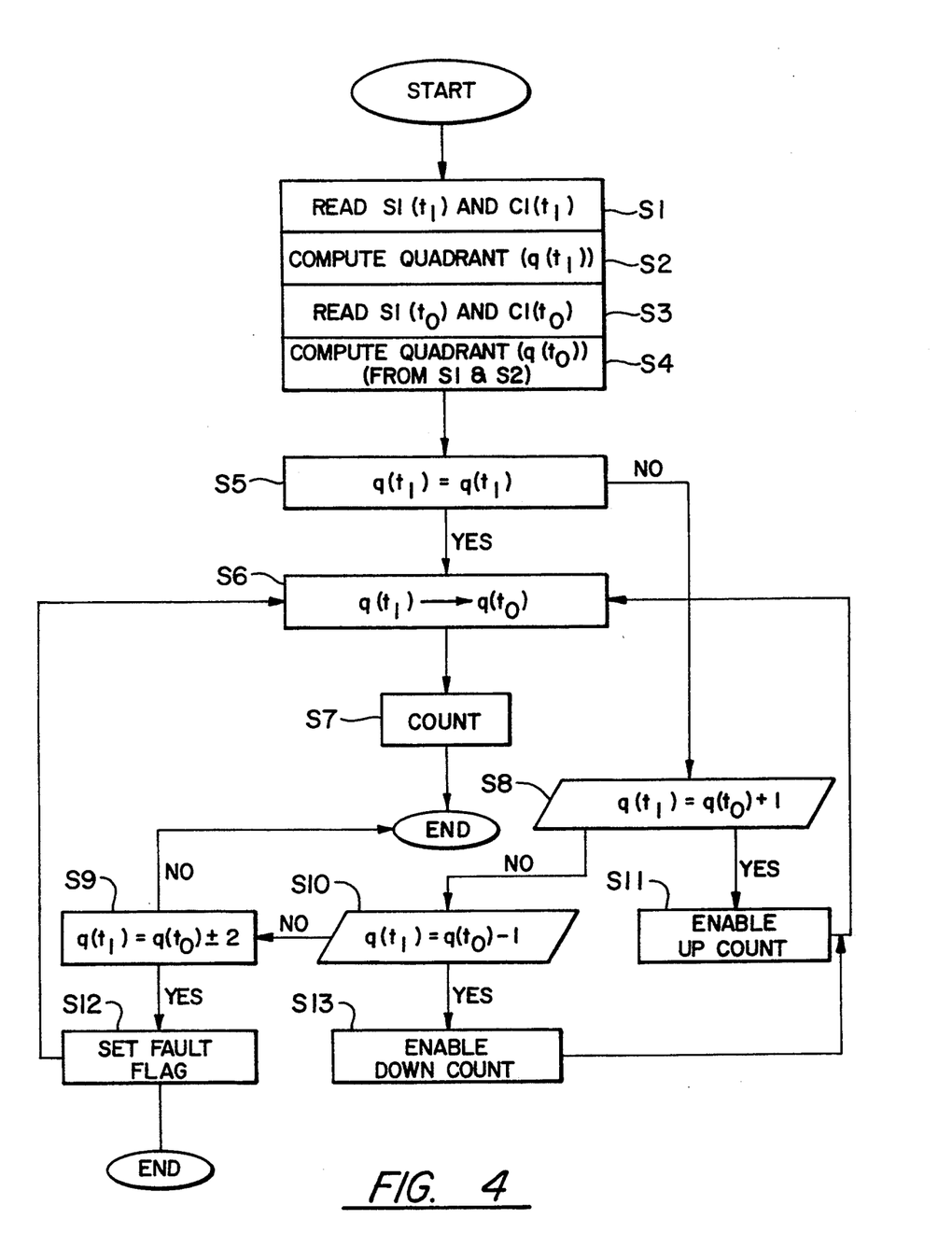
FIG. 4 is a flow chart showing signal processing steps for carrying out the invention in a computer or state machine.
Figure 5:
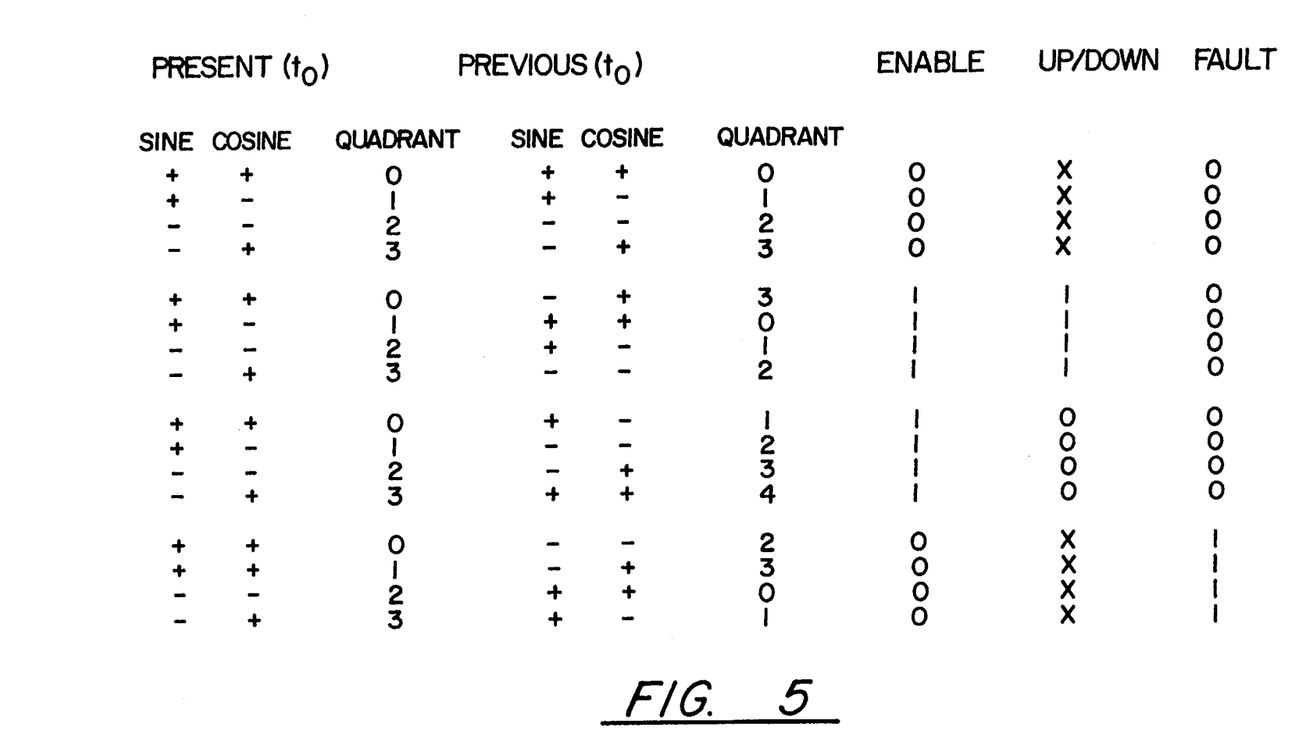
FIG. 5 is a state diagram of input and output states for a state machine used in the system shown in FIG. 3.

As noted, state machine, SM1 uses the two bits that represent the "most recent past" and the "present" algebraic sign (+ or −) value for the differences of the signals S1 and C1 from their respective average values. These are the same as the algebraic values of the sine-proportional and cosine-proportional components for S1 and C1, respectively. The logic for count enable may be expressed in terms of the state machine substrates representing current sign bits and the substrates representing prior sign bits. This is shown in FIG. 5. There four groups, each have different combinations for the states of the four inputs to the state machine, and the resulting enable, up/down count and fault, output based upon the sampled sign values at the present and past times S1 and C1. A first of these groups, provide the "hold" function set out in the slate table chart. That is the quadrant did not change. A fault bit is not produced and the counter receives no counter enable control signal. A second group of four, shows the increment function in which the quadrant increases, causing the quadrant count to increase by 1. A third group of four is associated with the condition in which the count decreases by one causing the count enable and count down in the output. A final group of four is associated with a quadrant jump that is an increase or decrease of more that one quadrant, and this causes production of the fault bit. It should be observed that the count does not increase or decrease when this happens. As explained previously, the observer at unit 18 may see an indication of quadrants and degrees, the former being a coarse measurement of X(t) at any time ($t_x$), the other a fine measurement within a period. One skilled in the art will appreciate that the distance and/or velocity of the object may be constructed mathematically using current computer technology using the information provided from the hold register 30 and the state machine SM2. For that matter, it is possible to use a computer in place of the state machines and counters, although state machines are believed preferable because they are faster in this application, which requires only a series of different logic states to accomplish the steps in FIG. 4 and therefore lends itself to state machine application rather than a programmed processor.

From the foregoing discussion, it should be appreciated that unlike the prior art, full tracking based on phase change frequency (e.g. dS1/dt and dC1/dt) is not required. If the object is stationary, the rate of change in phase is zero. The object's motion produces phase change frequency increases. The frequency can be considerable based on the carrier frequency and the object's velocity and displacement (as demonstrated by the previous example), following known Doppler shift principles. The invention has been shown to be capable of tracking these changes without the need for high speed analog to analog conversion capable of providing digital samples at the highest possible phase shift rates.

With the benefit of the previous discussion of the invention and one or more embodiments and variations of it, one skilled in the art may be able to make variations and modifications to the invention in whole or in part without departing from the true scope and spirit of the invention.

We claim:

1. A measurement apparatus characterized by:
   first means for providing a phase modulated signal from an object, the signal having a minimum and maximum frequency;
   second means for providing two quadrature signals from said phase modulated signal;
   third means for producing a quadrant signal by counting up and down the number of repetitions of the phase modulated exceeding a value of signal magnitude computed from each quadrature signal at two successive time intervals defined by clock signals with a frequency with a period that is a selected percentage of the quarter period for one cycle of the maximum frequency of the change in phase of the phased modulated signal, said third means comprising a first clock for providing the clock signals; and
   fourth means for providing a signal indicating a phase position within one period of the phase modulated signal based on the magnitude of said quadrant signal.

2. The apparatus described in claim 1, further characterized in that the selected percentage is 50 to 80 percent.

3. The apparatus described in claim 1, further characterized in that the two quadrature signals comprise sine and cosine functions of the phase modulated signal.

4. The apparatus described in claim 2 further characterized in that said value is the average magnitude of the quadrature signal and said third means produces a data bit when the phase modulated signal exceeds said value to produce said quadrant signal.

5. The apparatus described in claim 4, further characterized by a clock operating at the clock frequency; a shift register for receiving the data bit on a register input and for applying the bit to the register output in response to a clock signal at the clock frequency; the data bit and the shift register output being applied to the counting means.

6. The apparatus described in claim 5, further characterized by a comparator for providing the data bit from the phase modulated signal and said value.

7. The apparatus described in claim 1, further characterized in that the quadrant count and the signal indicating a phase position are simultaneously applied to a display in response to a clock signal controlling the rate at which the signal indicating a phase position is produced by the fourth means.

8. The apparatus described in claim 1, further characterized in that the means for counting comprises a state machine.

9. The apparatus described in claim 7, further characterized in that the third means for counting comprises a state machine.

10. The apparatus described in claim 1, further characterized in that the third means for counting comprises means for providing an indication that the the phase position has incremented or decremented more than one quadrant unit and for disabling the count in response to said indication.

11. The apparatus described in claim 9, further characterized in that the third means for counting comprises means for providing an indication that the the phase position has incremented or decremented more than one quadrant unit and for disabling the count in response to said indication.

12. The apparatus described in claim 9, further characterized by a second clock operating at a second frequency that is at least twice the frequency of the phase modulation signal and means, responsive to the quadrature signals, for providing a phase modulo signal indicating a value of each quadrature signal at a clock signal from the second clock; a means for providing a digital indication of the value indicated by the phase modulo signal in response to the clock signal from the second clock; and a means for displaying the phase modulo 360 from the digital indication.

13. A method for measuring phase change in a phase modulated signal, characterized by the steps of:
   providing two quadrature signals from said phase modulated signal;
   counting up and down the number of repetitions of the phase modulated signal in response to a value computed from each quadrative signal at two successive time intervals defined by a clock frequency with a period that is a selected percentage of the quarter period for one cycle of the frequency of the change in phase of the phase modulated signal at a selected maximum frequency;
   determining if the magnitude of the phase modulated signal exceeds its average at each interval to provide the value; and
   providing a signal indicating a phase position within one period of the phase modulated signal based on the peak value of the quadrature signal sampled at a second frequency that is at least twice the frequency of the change in phase at the maximum frequency.

14. The method described in claim 13, further characterized in that the selected percentage is between 50 and 80 percent.

15. The method described in claim 14, further characterized by the step of providing the quadrature signals as sine and cosine values the phase modulated signal as the quadrature and an average value for the cosine and sine values.

16. The method described in claim 15, further characterized by the step of providing a data bit indicating that each quadrature signal has exceeded the average value of the quadrature signal.

17. The method described in claim 16, further characterized by the step of operating a shift register for receiving the data bit on a register input and for applying the bit to the register output in response to a clock signal at the clock frequency; providing the data bit following the clock signal and simultaneously providing the data bit at a second subsequent clock signal for counting the quadrants.

18. The method described in claim 17, further characterized by the step of providing a count fault signal if a count of quadrants between successive clock signals exceeds one.

19. The apparatus described in claim 13, further characterized by a clock operating at the clock frequency; a shift register for receiving the data bit on a register input and for applying the bit to the register output in response to a clock signal at the clock frequency; and means for providing the data bit following the clock signal, the data bit following the clock signal and the data bit on the register output being simultaneously applied to the counting means.

* * * * *